United States Patent [19]

Shiohara et al.

[11] 4,116,907
[45] Sep. 26, 1978

[54] CHLORINE-CONTAINING RESIN COMPOSITIONS

[75] Inventors: Tomoo Shiohara; Takayoshi Matsunaga, both of Kyoto; Mikihiko Horioka, Kobe, all of Japan

[73] Assignee: Sekisui Kagaku Kogyo Kabushiki Kaisha, Osaka, Japan

[21] Appl. No.: 787,118

[22] Filed: Apr. 13, 1977

[30] Foreign Application Priority Data

Aug. 2, 1976 [JP] Japan .................................. 51-92671
Aug. 3, 1976 [JP] Japan .................................. 51-93076

[51] Int. Cl.² .............................................. C08K 3/34
[52] U.S. Cl. .......................... 260/23 XA; 260/42.49; 260/45.7 R; 260/45.85 R; 260/45.75 R; 260/45.95 L; 260/45.8 RW
[58] Field of Search .......... 260/23 XA, 42.49, 45.7 R, 260/45.7 S, 45.85 R, 45.85 E, 45.75 F, 45.75 R, 45.95 P, 45.95 L, 45.8 RW, 45.75 W

[56] References Cited

U.S. PATENT DOCUMENTS

| | | | |
|---|---|---|---|
| 2,179,973 | 11/1939 | Alexander | 260/45.7 R |
| 2,307,075 | 1/1943 | Quattlebaum et al. | 260/45.75 T |
| 2,387,571 | 10/1945 | Fikentscher et al. | 260/45.7 R |
| 3,242,133 | 3/1966 | Lindsey | 260/45.7 S |
| 3,417,039 | 12/1968 | Penneck | 260/45.75 W |
| 3,492,267 | 1/1970 | Wood | 260/45.75 W |

Primary Examiner—V. P. Hoke
Attorney, Agent, or Firm—Sughrue, Rothwell, Mion, Zinn and Macpeak

[57] ABSTRACT

A chlorine-containing resin composition comprising a chlorine-containing resin and, as thermal stabilizers for the chlorine-containing resin, the combination of (1) at least one magnesium diketone complex which is represented by the formula

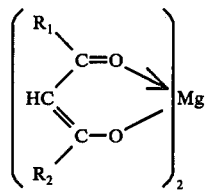

wherein $R_1$ represents a p-chlorophenyl group, a phenyl group, or a methyl group, and $R_2$ represents a p-chlorophenyl group, a phenyl group, a methyl group or an ethoxy group, (2) at least one of (a) a monohydric acyclic or cyclic alcohol having 8 to 18 carbon atoms, a dihydric alcohol represented by the formula $OH-(CH_2)_n-OH$ wherein n is an integer of 6 or more, a polyhydric alcohol or a mono- or di-ester of said polyhydric alcohol having at least one hydroxyl group, (b) a monovalent mercaptan or mercaptide having 3 to 18 carbon atoms, a divalent mercaptan or mercaptide having 5 to 12 carbon atoms, or a polyvalent mercaptan or mercaptide, or (c) a calcium salt of a monocarboxylic acid having 2 to 22 carbon atoms, a dicarboxylic acid monoalkyl ester having 8 to 36 carbon atoms, in which the alkyl moiety thereof has 6 to 18 carbon atoms, an unsaturated dicarboxylic acid monoalkyl ester having 15 to 36 carbon atoms, in which the alkyl moiety thereof has 6 to 18 carbon atoms, a monoaromatic dicarboxylic acid monoalkyl ester having 15 to 36 carbon atoms, in which the alkyl moiety thereof has 6 to 18 carbon atoms, or a thiocarboxylic acid having 2 to 7 carbon atoms, and (3) at least one of a calcium silicate, a calcium aluminate or a calcium titanate, each obtained by a calcination method.

8 Claims, No Drawings

CHLORINE-CONTAINING RESIN COMPOSITIONS

BACKGROUND OF THE INVENTION

1. Field of the Invention

This invention relates to a chlorine-containing resin composition which is non-toxic or has low toxicity and which has excellent thermal stability for prolonged periods of time.

2. Description of the Prior Art

It is well known that chlorine-containing resins such as polyvinyl chloride, polyvinylidene chloride, chlorinated polyvinyl chloride, chlorinated polyethylene, vinyl chloride-vinylidene chloride copolymers, vinyl chloride-vinyl acetate copolymers, vinyl chloride-ethylene copolymers and the like tend to undergo thermal decomposition which gives rise to a coloration of the resins upon processing and, therefore, it is desirable to incorporate thermal stabilizers into such chlorine-containing resins. The main thermal stabilizers for stabilizing chlorine-containing resins are calcium compounds, which have recently come into wide-spread use as a non-toxic or of low toxicity stabilizer in place of the conventionally used lead compounds such as lead salts and lead soaps. However, stabilizers for chlorine-containing resins which satisfy the requirements that they be both effective for preventing an initial stage coloration of the resins and also be effective for achieving thermal stability over prolonged periods of time, have not yet been developed. Calcium hydroxide which is a typical example of a hydroxide has a high ability to scavenge free hydrogen chloride which is evolved during the thermal decomposition of chlorine-containing resins, but hydrogen chloride is also removed from the resin molecules upon molding due to the high basicity of calcium hydroxide, thereby accelerating deterioration and coloration of the resins. Further, calcium carbonate which is also useful as a stabilizer has only a weak ability to scavenge hydrogen chloride and free hydrogen chloride which is evolved during the thermal decomposition of chlorine-containing resins is not sufficiently scavenged, thereby accelerating the decomposition and coloration of chlorine-containing resins.

Recently, chlorine containing resin compositions having an improved thermal stability comprising, as stabilizers, calcium compounds such as calcium silicates, calcium silicates having coated thereon an organic silicon compound; calcium titanates; calcium aluminates; and the like and, optionally, organic acid salts and/or organic tin compounds have been proposed, as described in U.S. Patent Application Ser. No. 636,199, filed Nov. 28, 1975 now U.S. Pat. No. 4,052,350. These resin compsitions generally have excellent thermal stability, i.e., minimized decomposition and coloration of the chlorine-containing resin upon heating during processing of the resin compositions, but these resin compositions, particularly those containing a large proportion of such inorganic stabilizers, tend to show slightly inferior processing capability and dyeability with pigments, in particular, in dyeing the resin compositions brown and dark gray colors.

SUMMARY OF THE INVENTION

As a result of extensive investigations to eliminate the above described disadvantages associated with conventional thermal stabilizers for chlorine-containing resin compositions, a chlorine-containing resin composition which is non-toxic or has low toxicity and which also has excellent thermal stability over prolonged periods of time has now been discovered thereby reaching the present invention.

The present invention provides a chlorine-containing resin composition comprising a chlorine-containing resin and, as thermal stabilizers for the chlorine-containing resin, the combination of (1) at least one magnesium diketone complex which is represented by the formula

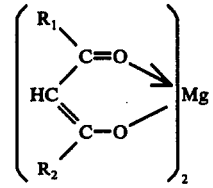

wherein $R_1$ represents a p-chlorophenyl group, a phenyl group, or a methyl group, and $R_2$ represents a p-chlorophenyl group, a phenyl group, a methyl group or an ethoxy group, (2) at least one of (a) a monohydric acyclic or cyclic alcohol having 8 to 18 carbon atoms, a dihydric alcohol represented by the formula $OH-(CH_2)_n-OH$ wherein $n$ is an integer of 6 or more, a polyhydric alcohol or a mono-or di-ester of said polyhydric alcohol having at least one hydroxyl group, (b) a monovalent mercaptan or mercaptide having 3 to 18 carbon atoms, a divalent mercaptan or mercaptide having 5 to 12 carbon atoms, or a polyvalent mercaptan or mercaptide, or (c) a calcium salt of a monocarboxylic acid having 2 to 22 carbon atoms, a dicarboxylic acid monoalkyl ester having 8 to 36 carbon atoms, in which the alkyl moiety thereof has 6 to 18 carbon atoms, an unsaturated dicarboxylic acid monoalkyl ester having 15 to 36 carbon atoms, in which the alkyl moiety thereof has 6 to 18 carbon atoms, a monoaromatic dicarboxylic acid monoalkyl ester having 15 to 36 carbon atoms, in which the alkyl moiety thereof has 6 to 18 carbon atoms, or a thiocarboxylic acid having 2 to 7 carbon atoms, and (3) at least one of a calcium silicate, a calcium aluminate or a calcium titanate, each obtained by a calcination method.

DETAILED DESCRIPTION OF THE INVENTION

Examples of suitable chlorine-containing resins which can be used in this invention include, for example, polyvinyl chloride, polyvinylidene chloride, a vinyl chloride-vinylidene chloride copolymer having a vinyl chloride content of about 5 to about 95% by weight; a vinyl chloride-vinyl acetate copolymer, most generally commercially available with a vinyl acetate content of about 0.4 to about 40 wt%, more often 0.5 to 20 wt%; a vinyl chloride-ethylene copolymer, most generally commercially available with an ethylene content of about 1 to about 15 mole% and an average degree of polymerization of about 700 to about 1500; chlorinated polyvinyl chloride, most generally commercially available with a chlorine content of about 60 to about 70 wt%, more often 63 to 68 wt%; and chlorinated polyethylene, most generally commercially available with a chlorine content of about 25 to about 45%.

Examples of suitable magnesium diketone complexes which can be used in the present invention as component (1) are those having the formula:

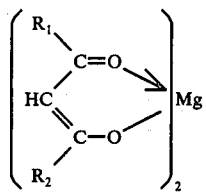

wherein $R_1$ represents a p-chlorophenyl group, a phenyl group, or a methyl group, and $R_2$ represents a p-chlorophenyl group, a phenyl group, a methyl group or an ethoxy group.

Typical examples of magnesium diketone complexes are di-p-chlorophenylbenzoylmethane magnesium, p-chlorbenzoyl benzoylmethane magnesium, p-chlorobenzoyl acetone magnesium, dibenzoylmethane magnesium, dibenzoylacetone magnesium, acetylacetone magnesium, ethyl acetoacetyl magnesium, etc.

These magnesium diketone complexes can be prepared in accordance with the procedure described in L. F. Hapch et al., *Journal of Organic Chemistry*, Vol. 13, pages 249-253.

Examples of suitable alcohols which can be used as component (2) in the present invention are monohydric acyclic or cyclic alcohols having 8 to 18 carbon atoms, for example, octanol, nonanol, decanol, 2-ethylhexanol, lauryl alcohol, cetyl alcohol, stearyl alcohol, phenethyl alcohol, benzhydrol and the like, dihydric alcohols represented by the formula $HO-(CH_2)_n-OH$ wherein $n$ is an integer of 6 or more, preferably 6 to 18, for example, hexamethylene glycol, heptamethylene glycol, octamethylene glycol, nonamethylene glycol, decamethylene glycol and the like, polyhydric alcohols, for example, trimethylol ethane, pentaerythritol, dipentaerythritol, mannitol, sorbitol, glycerin and the like, and derivatives thereof having at least one hydroxyl group such as mono or diesters of a polyalcohol. Particularly preferred alcohols are the dihydric alcohols as described above.

Examples of mercapto compounds which can be used as component (2) in the present invention are monovalent mercaptans or mercaptides, for example, propyl mercaptan, lauryl mercaptan, stearyl mercaptan, thiophenol, 2-benzothiazol, thioglycerin, etc., divalent mercaptans or mercaptides, for example, 1,2-dithioglycerin, 1,3-dithioglycerin, pentamethylenedithiol, hexamethylenedithiol, nonamethylenedithiol, octamethylenedithiol, dodecamethylenedithiol, 1,2-dithio-3-stearyl glycerin ester, etc., and polyvalent mercaptans or mercaptides, for example, trithioglycerin, etc.

The calcium salts of organic acids which can be suitably used as component (2) in this invention are calcium salts formed with monocarboxylic acids having 2 to 22 carbon atoms, e.g., acetic acid, caproic acid, pelargonic acid, lauric acid, palmitic acid, oleic acid, stearic acid, acrylic acid, methacrylic acid, ricinolic acid, etc.; dicarboxylic acid monoalkyl esters having 8 to 36 carbon atoms, in which the alkyl moiety thereof has 6 to 18 carbon atoms, e.g., esters of oxalic acid, malonic acid, succinic acid, glutaric acid, adipic acid, pimelic acid, suberic acid, azelaic acid, sebacic acid, etc.; unsaturated dicarboxylic acid monoalkyl esters having 15 to 36 carbon atoms, in which the alkyl moiety thereof has 6 to 18 carbon atoms, e.g., esters of maleic acid, fumaric acid, citraconic acid, mesaconic acid, itaconic acid, aconitic acid, etc.; monoaromatic monocarboxylic acids, e.g., benzoic acid, salicylic acid, etc.; monoaromatic dicarboxylic acid monoalkyl esters having 15 to 36 carbon atoms, in which the alkyl moiety thereof has 6 to 18 carbon atoms, e.g., esters of phthalic acid, terephthalic acid, etc.; and thiocarboxylic acids having 2 to 7 carbon atoms, e.g., thioglyconic acid, mercaptolactic acid, mercaptopropionic acid, etc. In particular, when non-toxicity is strictly required, it is preferred to use the calcium salts of propionic acid, 2-ethylhexoic acid, gluconic acid, sorbic acid, glycerolic acid, rhodinic acid, benzoic acid, higher fatty acids such as beef tallow hardened fatty acids, fish oil hardened fatty acids and oxy fatty acids, in which the fatty acid has 8 to 32 carbon atoms, and mixtures thereof. The most preferred organic acid salt is calcium stearate.

These calcium silicates as well as calcium aluminates and calcium titanates, which are hereinafter described in detail, can have any particle size, but are preferably used as a fine powder on the order of the size of generally used inorganic additives in the synthetic resin art. Although not desiring to be bound, fine particles of the compounds having a particle size of less than about 60 mesh, preferably less than 200 mesh, are advantageously used in the present invention.

The calcium aluminates and calcium titanates which can be used in the present invention can easily be obtained by mixing the oxide, hydroxide, carbonate, etc., of each of the constituent elements, melt-baking the resulting mixture in a conventional manner using an electric furnace or the like, followed by cooling and then pulverization. These compounds are generally obtained in the form of a complex salt or a calcined product. Hydrates of the above compounds can also be employed in this invention, and the hydrates can be obtained by a hydrothermal reaction using an autoclave or the like or the hydration of the corresponding anhydrides in a conventional manner.

The calcium silicates which can be used in this invention are of the same in quality as those used in the cement and ceramic industries. These calcium silicates are of low activity, i.e., they have a low ability as an anhydrated calcium silicate to take up a molecule of water to form a hydrate (the higher the activity, the higher the number of water molecules present in the hydrated form), generally having an anhydride structure with the bonding ratio of calcium oxide:silicic acid being 2:1, 3:1 and 3:2, respectively. These calcium silicates are generally described in H. F. W. Taylor, *Chemistry of Cement*, Vols. 1 & II, published by Academic Press Co., London/New York, 1964, and can be obtained by a dry synthesis method such as a calcination or melting method which is well-known in the art. When they are incorporated into chlorine-containing resins, they show a behavior entirely different from that of highly active calcium silicate compounds, i.e., those containing a high water content (hydrate structure) with the bonding ratio of calcium oxide:silicic acid being about 1:1, which can be obtained by a wet synthesis method, for example, Tobermolite ($CaO.SiO_2.H_2O$), Xonotrite ($5CaO.6SiO_2.5-9H_2O$) and the like. Accordingly, excellent thermal stability can be obtained for the first time with chlorine-containing resins by using the above described calcium silicates of low activity.

Examples of calcium silicates, calcium aluminates and calcium titanates which can be suitably used as component (3) in the present invention are dicalcium silicate ($2CaO.SiO_2$), tricalcium silicate ($3CaO.SiO_2$), 3:2-calcium silicate ($3CaO.2SiO_2$), mono-calcium aluminate (CaO.Al$_2$O$_3$), dicalcium aluminate (2CaO.Al$_2$O$_3$), tricalcium aluminate (3CaO.Al$_2$O$_3$), 1:2-calcium alminate (CaO.2Al$_2$O$_3$), 1:6-calcium aluminate (CaO.6Al$_2$O$_3$), 12:7-calcium aluminate (12CaO.7Al$_2$O$_3$), calcium titanate (CaO.TiO$_2$), dicalcium titanate (2CaO.TiO$_2$), tricalcium titanate (3CaO.TiO$_2$), etc.

Since the chlorine-containing resin composition of the present invention contains, as thermal stabilizers for the chlorine-containing resin a combination of, (1) at least one magnesium diketone complex, (2) at least one of an alcohol, a mercapto compound, or a calcium salt of an organic acid and (3) at least one compound selected from the group consisting of a calcium silicate, a calcium aluminate and a calcium titanate, each obtained by a calcination method, in addition to a chlorine-containing resin, a markedly improved effect for preventing the initial stage coloration of the resins, which cannot be expected in the conventional non-toxic composition, as well as an improved thermal stability for prolonged periods of time both of which are ascribable to the synergistic effects of the above-mentioned components are obtained.

With respect to the amount of the stabilizers used in the present invention, about 0.5 to about 20 parts, preferably 1 to 5 parts, by weight of (1) the magnesium diketone complex based on 100 parts by weight of the chlorine-containing resin, (2) about ½ to about 2 moles, preferably 1 mole, of the alcohol per mole of the magnesium diketone complex or about 0.5 to about 5 parts, preferably 0.5 to 2 parts, by weight of the calcium salt of an organic acid, about 0.05 to about 1 part, preferably 0.1 to 0.5 part, by weight of the mercapto compound based on 100 parts by weight of the chlorine-containing resin and (3) about 1 to about 20 parts, preferably 1 to 5 parts, by weight of at least one compound selected from the group consisting of a calcium silicate, a calcium aluminate and a calcium titanate, each obtained by a calcination method, can advantageously be used. However, the amount of the stabilizers used in the present invention is not limited to the above-described ranges.

The stabilizers used in the chlorine-containing resin compositions, i.e., the combination of the compounds (1) (2) and (3) can be used in a proportion of about 1.6 to about 25 parts by weight, preferably 2 to 6 parts by weight, per 100 parts by weight of the chlorine-containing resin.

Further, if desired, other stabilizers, fillers such as calcium carbonate, silicic acid and the like, pigments such as titanium oxide and the like, lubricants such as stearic acid, palmitic acid and the like, etc., can also be used in the chlorine-containing resin composition. These additives can be used in a proportion well established in the art depending on the type of additives and resins as well as depending on the utility of the final resin compositions, but generally, they can be used in a proportion of about 1 to about 20 parts by weight of a filler, about 0.1 to about 5 parts by weight of a lubricant and about 1 to about 3 parts by weight of a pigment, per 100 parts by weight of the resin.

The present invention is further illustrated by the following Examples and Reference Examples, but these examples are given for illustrative purposes only and are not to be construed as limiting the present invention. Unless otherwise indicated, all parts, percents, ratios and the like are by weight. In these examples, the polyvinyl chloride used had an average degree of polymerization of 1100 and the polyethylene wax was used as a lubricant.

EXAMPLE 1

A uniformly blended powder mixture of 2.2 parts (1/100 mol) of acetylacetone magnesium, 0.98 part (1/200 mol) of hexamethylene glycol, 2 parts of dicalcium silicate and 1.0 part of polyethylene wax was added to 100 parts of polyvinyl chloride, and the resulting mixture was kneaded under heating in a screw type kneader using a Brabender Plastograph made by HAAE Co. The thermal resistance of the resulting composition was then evaluated in terms of effect in preventing coloration at the initial stage and thermal stability over a prolonged period of time by observing changes in coloration of the composition. The results obtained are shown in Table 1 below. In this test, the kneading conditions used in the Plastograph were as follows:

Amount of Mixture (Sample): 70 g
Revolution Rate of Screw: 60 r.p.m.
Aging Time After Charging Sample: 5 minutes
Temperature After Charging: 185° C In comparison, mixtures each having a composition similar to the above but each containing acetylacetone lithium, acetylacetome calcium or α-aminocrotonic acid ester in place of the acetylacetone magnesium was also prepared and tested and the results obtained are shown in Table 1 as Reference Example No. 1, 2 or 3.

Table 1

| Components | Example 1 | Reference Example 1 | Reference Example 2 | Reference Example 3 |
|---|---|---|---|---|
| Polyvinyl Chloride | 100 | 100 | 100 | 100 |
| Acetylacetone Magnesium | 2.2 (1/100 mol) | — | — | — |
| Acetylacetone Lithium | — | 2.2 (2/100 mol) | — | — |
| Acetylacetone Calcium | — | — | 2.4 (1/100 mol) | — |
| α-Aminocrotonic Acid Ester | — | — | — | 3.0 (1/100 mol) |
| Hexamethylene Glycol | 0.93 (1/200 mol) | 1.86 (1/100 mol) | 0.93 (1/200 mol) | 1.86 (1/200 mol) |
| Dicalcium Silicate | 2 | 2 | 2 | 2 |
| Polyethylene Wax | 1 | 1 | 1 | 1 |
| Thermal Resistance After Plastograph Kneading | | | | |
| 3 min. | White | Light Yellow | Light Yellow | Yellow |
| 5 min. | White | Light Yellow | Yellow | Dark Brown |
| 10 min. | White | Yellow | Orange | Black |
| 15 min. | Yellow | Orange | Orange | — |

As is apparent from the results shown in Table 1, the composition containing the three stabilizers of the present invention in combination exhibits a markedly improved effect in preventing initial stage coloration and in thermal stability of the chlorine-containing resin composition due to the synergistic effect of the stabilizers.

EXAMPLE 2

Two parts of acetylacetone magnesium, 0.2 part of 2-benzothiazol, 2 parts of dicalcium silicate and 0.5 part of polyethylene wax were added to 100 parts of polyvinyl chloride, and the resulting mixture was blended uniformly in a mixing and grinding machine. The mixed powder thus obtained was then kneaded in a kneading roll at a temperature of 200° C and the thermal resistance of the resulting composition was evaluated in terms of effect in preventing initial stage coloration and thermal stability over a prolonged period of time by observing changes in coloration of the composition. The results obtained as shown in Table 2 below.

For comparison, the compositions were prepared in the same manner as above but using either acetylacetone magnesium or 2-benzothiazol alone or in combination without using dicalcium silicate. The results obtained for these compositions are also shown in Table 2 as Reference Examples 4 to 6.

Table 2

| Components | Amounts (parts by weight) | | | |
|---|---|---|---|---|
| | Example 2 | Reference Example 4 | Reference Example 5 | Reference Example 6 |
| Polyvinyl Chloride | 100 | 100 | 100 | 100 |
| Acetylacetone Magnesium | 2 | 2 | — | 2 |
| 2-Benzothiazol | 0.2 | — | 0.2 | 0.2 |
| Dicalcium Silicate | 2 | — | — | — |
| Polyethylene Wax | 0.5 | 0.5 | 0.5 | 0.5 |
| Color of Sheets After Roll Kneading | | | | |
| 5 min. | White | Yellow | Black Purple | Light Yellow |
| 10 min. | White | Orange | — | Black |
| 15 min. | Light Yellow | Brown | — | — |
| 20 min. | Orange | Red-Brown | — | — |
| 25 min. | Red-Orange | Dark Brown | — | — |

As is apparent from the results shown in Table 2, the prevention of initial stage coloration and the thermal stability over a prolonged period of time are markedly improved only when the three stabilizers are used in combination according to the present invention due to the synergistic effect of these stabilizers. Further, these stabilizers do not cause any blackening effect as observed in Reference Examples 5 or 6 even though a mercapto compound containing a nitrogen atom is present in the composition.

EXAMPLE 3

Two parts of acetylacetone magnesium, 1 part of 1,8-octylmercaptan, 2 parts of dicalcium silicate and 0.5 part of polyethylene wax were added to 100 parts of polyvinyl chloride, and the resulting powder composition was then subjected to the thermal resistance test as described in Example 1. The results obtained are shown in Table 3 below.

In comparison, various compositions were also prepared in the same manner as described above but using the components indicated in Table 3 as Reference Examples 7 to 13, and the resulting compositions were subjected to the thermal resistance test as described in Example 2. The results obtained are also shown in Table 3.

Table 3

| Components | Amounts (parts by weight) | | | | | | | |
|---|---|---|---|---|---|---|---|---|
| | Example 3 | Reference Example 7 | Reference Example 8 | Reference Example 9 | Reference Example 10 | Reference Example 11 | Reference Example 12 | Reference Example 13 |
| Polyvinyl Chloride | 100 | 100 | 100 | 100 | 100 | 100 | 100 | 100 |
| Acetylacetone Magnesium | 2 | — | — | — | — | — | — | — |
| 1,8-Octylmercaptan | 1 | 1 | — | — | 1 | 1 | — | — |
| α-Phenylindole | — | — | 2 | — | 2 | — | — | — |
| α-Aminocrotonic Acid Ester | — | — | — | 2 | — | 2 | — | — |
| Epoxidized Soybean | — | — | — | — | — | — | 2 | — |
| Dicalcium Silicate | 2 | 2 | 2 | 2 | 2 | 2 | 2 | 2 |
| Calcium Stearate | — | — | — | — | — | — | 2 | 2 |
| Zinc Stearate | — | — | — | — | — | — | 1 | 1 |
| Polyethylene Wax | 0.5 | 0.5 | 0.5 | 0.5 | 0.5 | 0.5 | 0.5 | 0.5 |
| Color of Sheets After Roll Kneading | | | | | | | | |
| 5 min. | White | Orange | Yellow | Yellow | Light Yellow | Yellow | Blackened | Yellow |
| 10 min. | White | Dark Brown | Blackened | Blackened | Yellow Orange | Blackened | — | Yellow |
| 15 min. | Yellow | — | — | — | Dark Brown | — | — | Yellow Orange |
| 20 min. | Orange | — | — | — | Blackened | — | — | Blackened |
| 25 min. | Red-Orange | — | — | — | — | — | — | — |

As is apparent from the results shown in Table 3 above, the marked improvement in the prevention of initial stage coloration and the thermal stability over a prolonged period of time can be achieved only when these stabilizers are used in combination in accordance with the present invention due to the synergistic effect of these stabilizers. In contrast, the resin compositions in the Reference Examples show poor thermal stability which is not practically useable.

EXAMPLE 4

Two parts of tricalcium silicate, 1 part of calcium stearate, 2 parts of acetylacetone magnesium and 0.5 part of polyethylene wax were added to 100 parts of polyvinyl chloride and the mixture was blended uniformly in a comminutor (triturator). The resulting mixture was then kneaded at a temperature of 200° C. using a kneading roll, and thermal resistance of the composition thus obtained was evaluated in terms of thermal resistance time by determining the time required for the roll-kneaded sheet becoming orange colored. The results obtained are shown in Table 4 below. In comparison, various compositions as indicated in Table 4 were also tested and the test results obtained are also shown in Table 4 as Reference Examples 14 to 20.

As is apparent from the results shown in Table 4, the thermal resistance time of the chlorine-containing resin compositions was markedly prolonged only when three stabilizers are used in combination in accordance with the present invention. Such excellent effect is believed to be caused by the synergistic effect of the stabilizers. The results clearly indicate that the excellent thermal resistance comparable to that obtainable by using three stabilizers of the present invention cannot be achieved when one or two stabilizers of the present invention are replaced by other chemically analogous substances.

EXAMPLES 5 to 8

Chlorine-containing resin compositions were prepared in the same manner as described in Example 4 but using each of dicalcium silicate, monocalcium aluminate, dicalcium aluminate and tricalcium aluminate in place of the tricalcium silicate, and the resulting compositions were tested for the thermal resistance as described in Example 4. The results obtained are shown in Table 4.

As is apparent from the results shown in Table 4, the thermal resistance time in each composition was markedly prolonged as compared with those of Reference Examples 14 to 20 due to the synergistic effect of the combination of three stabilizers according to the present invention.

Table 4

| Components | Example Nos. | | | | | Reference Example Nos. | | | | | | |
|---|---|---|---|---|---|---|---|---|---|---|---|---|
| | 4 | 5 | 6 | 7 | 8 | 14 | 15 | 16 | 17 | 18 | 19 | 20 |
| Polyvinyl Chloride | 100 | 100 | 100 | 100 | 100 | 100 | 100 | 100 | 100 | 100 | 100 | 100 |
| Dicalcium Silicate | — | 2 | — | — | — | — | — | — | — | — | — | — |
| Tricalcium Silicate | 2 | — | — | — | — | 2 | 2 | 2 | — | — | — | — |
| Monocalcium Aluminate | — | — | 2 | — | — | — | — | — | — | — | — | — |
| Dicalcium Aluminate | — | — | — | 2 | — | — | — | — | — | — | — | — |
| Tricalcium Aluminate | — | — | — | — | 2 | — | — | — | — | — | — | — |
| Calcium Hydroxide | — | — | — | — | — | — | — | — | 2 | 2 | 2 | 2 |
| Calcium Stearate | 1 | 1 | 1 | 1 | 1 | — | 1 | — | 1 | 1 | — | 1 |
| Magnesium Stearate | — | — | — | — | — | 1 | — | 1 | — | — | 1 | — |
| Acetylacetone Calcium | — | — | — | — | — | — | 2 | 2 | 2 | — | — | — |
| Acetylacetone Magnesium | 2 | 2 | 2 | 2 | 2 | 2 | — | — | — | 2 | 2 | — |
| Polyethylene Wax | 0.5 | 0.5 | 0.5 | 0.5 | 0.5 | 0.5 | 0.5 | 0.5 | 0.5 | 0.5 | 0.5 | 0.5 |
| Heat Resistant Time (min.) | 20 | 18 | 10 | 13 | 17 | 5 | 3.5 | 3.5 | 1.5 | 7 | 3.5 | 5 |

EXAMPLES 9 to 11

Two parts of tricalcium silicate, tricalcium aluminate or monocalcium titanate, 1 part of calcium stearate, 2 parts of acetylacetone magnesium and 0.5 part of polyethylene wax were added to 100 parts of polyvinyl chloride, and the resulting mixture was blended uniformly in a mixing and grinding machine followed by kneading at a temperature of 200° C. for 5 minutes in a kneading roll. The roll-kneaded sheets thus obtained were then tested in a gear-oven type heat tester at a temperature of 185° C. to 187° C. to evaluate the coloration of the sheets. The results obtained are shown in Table 5 below.

For comparison, various compositions were prepared in the same manner as above but using acetylacetone lithium, acetylacetone copper, acetylacetone zinc, acetylacetone aluminum, acetylacetone tin or acetylacetone zirconium in place of acetylacetone magnesium and were evaluated by observing the color changes in thermal tests. The results obtained are also shown in Table 5 as Reference Examples 21 to 24.

Table 5

| Components | Example Nos. | | | Reference Example Nos. | | | | | |
|---|---|---|---|---|---|---|---|---|---|
| | 9 | 10 | 11 | 21 | 22 | 23 | 24 | 25 | 26 |
| Polyvinyl Chloride | 100 | 100 | 100 | 100 | 100 | 100 | 100 | 100 | 100 |
| Tricalcium Silicate | 2 | — | — | 2 | 2 | 2 | 2 | 2 | 2 |
| Tricalcium Aluminate | — | 2 | — | — | — | — | — | — | — |
| Monocalcium Titanate | — | — | 2 | — | — | — | — | — | — |
| Calcium Stearate | 1 | 1 | 1 | 1 | 1 | 1 | 1 | 1 | 1 |
| Acetylacetone Magnesium | 2 | 2 | 2 | — | — | — | — | — | — |
| Acetylacetone Metal Complex | — | — | — | 2 (Li Complex) | 2 (Cu Complex) | 2 (Zinc complex) | 2 (Al Complex) | 2 (Tin Complex) | 2 (Zr Complex) |
| Polyethylene Wax | 0.5 | 0.5 | 0.5 | 0.5 | 0.5 | 0.5 | 0.5 | 0.5 | 0.5 |
| Color of Roll Kneaded Sheets | White | Light Yellow | White | Yellow-Orange | Yellow | Black Spots on White ground | Orange-Red | Black Spots on White Background | Dark Red |
| Color of Sheets After Thermal Tests 10 min. | Light Yellow | Yellow | Light Yellow | Yellow-Orange | Yellow-Orange | Blackened | Red | Blackened | Dark Red |

Table 5-continued

| Components | Example Nos. | | | | Reference Example Nos. | | | | |
|---|---|---|---|---|---|---|---|---|---|
| | 9 | 10 | 11 | 21 | 22 | 23 | 24 | 25 | 26 |
| 20 min. | Light Yellow | Yellow | Yellow | Brown | Orange | — | Dark Red | — | Dark Red |
| 30 min. | Yellow | Orange | Yellow | Red-Brown | Red-Orange | — | Dark Red | — | Dark Red |

As is apparent from the results shown in Table 5 above, the roll kneaded sheets prepared from the chlorine-containing resin compositions containing a combination of three stabilizers according to the present invention showed a white to light yellow color, and also showed only a light yellow to orange color even after being subjected to the thermal tests (10 to 30 minutes), whereas the roll kneaded sheets prepared from the compositions prepared using diketone metal complexes other than a magnesium diketone complex (Reference Examples 21 to 26) were deeply colored and also were drastically colored, with some sheets being blackened. Thus, the results indicate that a combination of three stabilizers according to the present invention is effective for preventing initial stage coloration of chlorine-containing resin compositions.

EXAMPLES 12 to 17

Two parts of dicalcium silicate, 2 parts of calcium stearate, 0.5 part of polyethylene wax and 2 parts of each of various magnesium diketone complexes were added to 100 parts of polyvinyl chloride, and the resulting compositions were blended uniformly in a mixing and grinding machine, and coloration in each of the resulting mixtures was evaluated after kneading in a roll kneader at a temperature of 200° C. for 5 to 30 minutes. The results obtained are shown in Table 6 below.

and modifications can be made therein without departing from the spirit and scope thereof.

What is claimed is:

1. A chlorine-containing resin composition comprising a chlorine-containing resin and, as thermal stabilizers for the chlorine-containing resin, the combination of (1) at least one magnesium diketone complex which is represented by the formula

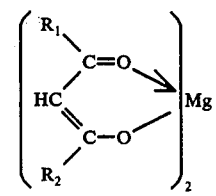

wherein $R_1$ represents a p-chlorophenyl group, a phenyl group, or a methyl group, and $R_2$ represents a p-chlorophenyl group, a phenyl group, a methyl group or an ethoxy group, (2) at least one of (a) a monohydric acyclic or cyclic alcohol having 8 to 18 carbon atoms, a dihydric alcohol represented by the formula $OH-(CH_2)_n-OH$ wherein $n$ is an integer of 6 or more, a polyhydric alcohol or a mono- or di-ester of said polyhydric alcohol having at least one hydroxyl group, Table 6

| Components | Amounts (Parts by Weight) | | | | | |
|---|---|---|---|---|---|---|
| | Example 12 | Example 13 | Example 14 | Example 15 | Example 16 | Example 17 |
| Polyvinyl Chloride | 100 | 100 | 100 | 100 | 100 | 100 |
| Dicalcium Silicate | 2 | 2 | 2 | 2 | 2 | 2 |
| Calcium Stearate | 2 | 2 | 2 | 2 | 2 | 2 |
| Di-p-chlorobenzoylmethane Magnesium | 2 | — | — | — | — | — |
| p-Chlorobenzoyl Benzoylmethane Magnesium | — | — | 2 | — | — | — |
| p-Chlorobenzoyl Acetone Magnesium | — | 2 | — | 13 | — | — |
| Dibenzoylacetone Magnesium | — | — | — | 2 | — | — |
| Dibenzoylmethane Magnesium | — | — | — | — | 2 | — |
| Acetylacetone Magnesium | — | — | — | — | — | 2 |
| Polyethylene Wax | 0.5 | 0.5 | 0.5 | 0.5 | 0.5 | 0.5 |
| Color of Roll Kneaded Sheets | | | | | | |
| 5 min. | White | White | White | White | White | White |
| 10 min. | White | White | White | White | Light Yellow | Light Yellow |
| 15 min. | White | White | Yellow-White | Light Yellow | Light Yellow | Orange |
| 20 min. | White | Light Yellow | Orange | Yellow | Orange-Red | Orange-Red |
| 25 min. | Light Yellow | Light Yellow | Red-Brown | Orange-Yellow | Orange-Red | Orange-Red |
| 30 min. | Light Yellow | Orange | Red-Brown | Orange-Red | Red-Brown | Red-Brown |

As is apparent from the results shown in Table 6, a combination of three stabilizers according to the present invention using each of various magnesium diketone complexes was effective for preventing initial stage coloration of the chlorine-containing resin compositions and revealed a thermal stabilizing effect after roll kneading over a prolonged period of time.

While the invention has been described in detail and with reference to specific embodiments thereof, it will be apparent to one skilled in the art that various changes or (b) a monovalent mercaptan or mercaptide having 3 to 18 carbon atoms, a divalent mercaptan or mercaptide having 5 to 12 carbon atoms, or a polyvalent mercaptan or mercaptide, and (3) at least one of a calcium silicate, a calcium aluminate or a calcium titanate, each obtained by a calcination method and being anhydrous.

2. The chlorine-containing resin composition according to claim 1, wherein said chlorine-containing resin is selected from the group consisting of polyvinyl chloride, polyvinylidene chloride, a vinyl chloride-vinylidene chloride copolymer, a vinyl chloride-vinyl acetate copolymer, a vinyl chloride-ethylene copolymer, a chlorinated polyvinyl chloride and a chlorinated polyethylene.

3. The chlorine-containing resin composition according to claim 1, wherein said magnesium diketone complex is di-p-chlorophenylbenzoylmethane magnesium, p-chlorobenzoyl benzoylmethane magnesium, p-chlorobenzoyl acetone magnesium, dibenzoylmethane magnesium, dibenzoylacetone magnesium, acetylacetome magnesium or ethylacetoacetyl magnesium.

4. The chlorine-containing resin composition according to claim 1, wherein said component (2) is a monohydric acylic or cyclic alcohol having 8 to 18 carbon atoms, a dihydric alcohol represented by the formula OH-$(CH_2)_n$-OH wherein $n$ is an integer of 6 or more, a polyhydric alcohol or a mono- or di-ester of said polyhydric alcohol having at least one hydroxyl group.

5. The chlorine-containing resin composition according to claim 4, wherein said alcohol is a dihydric alcohol having the formula OH—$(CH_2)_n$—OH wherein $n$ is an integer of 6 to 18.

6. The chlorine-containing resin composition according to claim 1, wherein said component (2) is a monovalent mercaptan or mercaptide having 3 to 18 carbon atoms, a divalent mercaptan or mercaptide having 5 to 12 carbon atoms, or a polyvalent mercaptan or mercaptide.

7. The chlorine-containing resin composition according to claim 6, wherein said mercaptan is propyl mercaptan, lauryl mercaptan, stearyl mercaptan, thiophenol, 2-benzothiazol, thioglycerin, 1,2-dithioglycerin, 1,3-dithioglycerin, pentamethylenedithiol, hexamethylenedithiol, nonamethylenedithiol, octamethylenedithiol, dodecamethylenedithiol, 1,2-dithio-3-stearyl glycerin ester or trithioglycerin.

8. The chlorine-containing resin according to claim 1, wherein said component (3) is a compound selected from the group consisting of dicalcium silicate (2CaO.$SiO_2$), tricalcium silicate (3CaO.$SiO_2$), 3:2-calcium silicate (3CaO.$2SiO_2$), mono-calcium aluminate (CaO.$Al_2O_3$), dicalcium aluminate (2CaO.$Al_2O_3$), tricalcium aluminate (3CaO.$Al_2O_3$), 1:2-calcium alminate (CaO.$2Al_2O_3$), 1:6-calcium aluminate (CaO.$6Al_2O_3$), 12:7-calcium aluminate (12CaO.$7Al_2O_3$), calcium titanate (CaO.$TiO_2$), dicalcium titanate (2CaO.$TiO_2$), and tricalcium titanate (3CaO.$TiO_2$).

* * * * *